Figure 1:
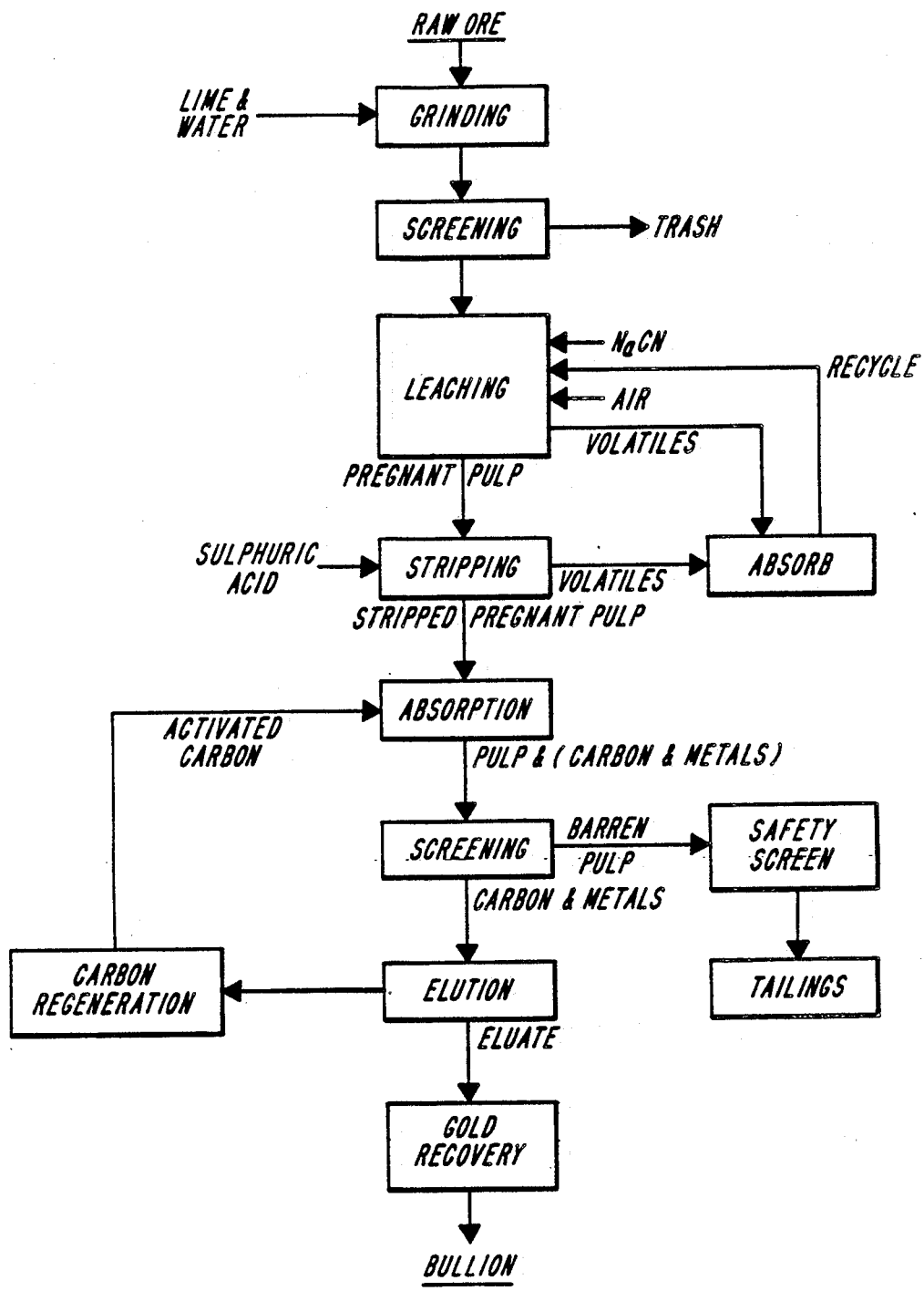

United States Patent [19]

Fricker

[11] Patent Number: 4,992,097
[45] Date of Patent: Feb. 12, 1991

[54] METAL RECOVERY PROCESS

[75] Inventor: Alan G. Fricker, Korokoro, New Zealand

[73] Assignee: Her Majesty the Queen in right of New Zealand (Department of Scientific and Industrial Research, New Zealand

[21] Appl. No.: 419,829

[22] Filed: Oct. 11, 1989

[30] Foreign Application Priority Data

Oct. 12, 1988 [NZ] New Zealand .................. 226529

[51] Int. Cl.$^5$ ............................................. C22B 3/00
[52] U.S. Cl. ........................................ 75/733; 75/736
[58] Field of Search ............... 75/97, 101 R, 105, 733, 75/736; 423/27

[56] References Cited

U.S. PATENT DOCUMENTS

| | | | |
|---|---|---|---|
| 4,632,701 | 12/1986 | Berezowsky | 75/101 |
| 4,731,114 | 3/1988 | Ramadorai | 75/101 |
| 4,872,909 | 10/1989 | Allen | 75/101 |

Primary Examiner—Peter D. Rosenberg
Attorney, Agent, or Firm—Lahive & Cockfield

[57] ABSTRACT

The invention relates to a process for the recovery of a valuable metal(s) from its ore(s), that includes a method for removal of environmentally hazardous, volatile material prior to the removal of the metal(s) from its ore pulp or liquor carrier.

The process comprises forming a pulp of particles of the ore(s) and leaching from that pulp the valuable metal component via the formation of soluble metal complexes.

As elements of the leaching chemicals used are often volatile at least the liquor component of the metal containing pulp is contacted by flow of gas to remove any volatile content. In the case of the leaching chemicals volatile elements the recycling of the volatile element to reform the original leaching chemical is a substantial advantage.

The metal is removed from the pulp, or its liquor component, by methods known in the art such as adsorption onto carbon or resin, electrowinning, zinc cementation, precipitation solvent extraction or the like.

The metal is then recovered in its solid form.

17 Claims, 2 Drawing Sheets

METAL RECOVERY PROCESS

The invention comprises a process for the recovery of valuable metals from ores thereof.

Metals such as gold or silver may be recovered from ores by various chemical processes. Nickel, cobalt, copper, manganese and magnesium are examples of other valuable metals that may also be obtained by chemical recovery processes from their ores.

In carbon-in-pulp type processes including the carbon-in-leach process as are used to recover gold or silver from their ores, the raw ores are finely ground and a slurry of the ground ore referred to as a pulp is formed. A chemical such as an alkali metal cyanide, for example NaCN, is added to the pulp to leach the gold from the ground ore by forming cyanide complexes of the gold. To prevent excessive volatilization of the cyanide from the pulp as hydrogen cyanide during leaching, the process is carried out under alkaline conditions at a pH of around 10.5. These alkaline conditions are typically achieved by the addition of lime to the pulp. The gold cyanide complexes are then recovered from what is referred to as the pregnant pulp by adding granular activated carbon, or other adsorption media such as a suitable adsorption resin, to the pulp or by passing the pregnant pulp through a column of activated carbon or resin, so that the gold complexes are adsorbed onto the carbon or resin adsorption media. In carbon-in-leach processes, which may be considered as a variation of carbon-in-pulp processes, some adsorption is carried out towards the end of leaching, by passing the carbon through the last one or more of a series of leach vessels for example. In either case the carbon granules are coarser than the particles of the pregnant pulp, and the carbon particles having adsorbed thereon the gold complexes may then be removed from the pulp by screening. The gold is then recovered from the carbon by elution and recovery of the gold from the resulting liquor. What is referred to as the barren pulp, comprising the balance of the pulp after removal of the gold complexes, is ejected to tailings ponds or the like.

In carbon-in-pulp processes of this type, to ensure that all the gold or other valuable metal is recovered from the ground ore, excess leaching chemical, such as the NaCN, is employed. The barren pulp disposed of to tailings ponds thus contains the majority of the cyanide, which has not complexed with gold and other metals from the ground ore, and which is environmentally undesirable. Similar leaching processes to recover nickel and cobalt such as the Sherritt Gordon process, and processes to recover copper utilize excess ammonia to complex with the metal and similar environmental, economic and technical concerns can arise. These concerns also arise with other metal recovery processes using a volatile leaching chemical, such as sulphur dioxide used for the recovery of manganese and magnesium, and chlorine used for the recovery of base metals, copper, lead and zinc.

In processes other than carbon-in-pulp type processes used to recover gold or silver or other valuable metals from their ores, leaching of a similar slurry of ground ore pulp is used to remove the metal(s) from the ore, and then the liquor component of the pulp containing the complexes is separated from the balance of the pulp comprising the solids. The barren solids are disposed of to tailings, while the valuable metal(s) is then recovered from the pregnant liquor by techniques such as precipitation, solvent extraction, zinc cementation or electrowinning, wherein the metal(s) is recovered from a solution of its salts by passing an electric current through the solution. Again, to ensure that all the gold or other valuable metals are recovered, excess leaching chemical is used, so that wastage of leaching chemical may occur.

The invention provides an improved or at least alternative process for recovery of such valuable metals from their ores wherein either the level of environmentally undesirable elements of the leaching chemicals used in the leaching process present in the tailings, in for example a carbon-in-pulp type process, or the use of excess leaching chemicals, in for example solids-liquids separation type processes, and preferably both is minimize or substantially reduced.

The process of the invention is applicable to the recovery of valuable metals such as gold, silver, cobalt, nickel, copper, lead, zinc, manganese or magnesium by leaching from their ores. The term 'ore(s)' as used in this specification is to be understood as including all sources from which metals having commercial value may be extracted.

In broad terms the invention may be said to comprise a process for recovering a valuable metal or metals from an ore or ores thereof comprising:

forming a pulp of particles of the ore(s) including at least one leaching chemical which will react with the valuable metal(s) to remove same from the ore(s), contacting at least the liquor component of the pulp containing the valuable metal(s) with a flow of gas for removal into the gas of any of the leaching chemical(s) volatile residual elements and/or other volatile products of the leaching process, prior to recovery of any major portion of the valuable metal(s) from the pulp, and recovering the metal(s).

In many leaching processes which use volatile residual elements of the leaching chemical(s) which have not reacted in the leaching process to form complexes with the valuable metals tend to be volatile under typical process conditions. In the process of the invention these volatiles are removed prior to removal of the valuable metal complexes, or at least any major portion thereof. Any volatile products of the leaching process may also similarly be removed.

In carbon-in-pulp type processes, including carbon-in-leach processes, residual volatile elements of the leach chemical(s), such as the cyanide, may be removed or stripped from the pregnant pulp by passing a flow of air through the pulp prior to recovery of the valuable metals from the pulp by adsorption onto carbon or resin adsorption media. The cyanide content in the barren pulp disposed of as tailings after recovery of the valuable metal(s) will be substantially reduced.

In processes where the liquor component of the pulp containing the valuable metal(s) is separated from the solids in a solid-liquid separation stage before recovery of the metal(s) from the liquor, the residual volatile elements of the leaching chemical(s) may be removed or stripped from the pregnant liquor by passing a flow of air through the pregnant liquor prior to recovery of the metal(s) by precipitation, solvent extraction, zinc cementation or the like.

In the recovery of gold from ores with NaCN as the leaching chemical, for example, in either case the residual cyanide in the pulp or liquor after leaching may be removed or stripped as HCN, with the process of the invention.

The cyanide or other volatiles such as HCN thus removed in either case may be recycled for reuse in the leaching process, to reduce consumption of the leaching chemical(s). For example, the HCN recovered from the pregnant pulp or liquor from gold or silver recovery with NaCN may be reconverted to NaCN and added back into the leaching pulp.

It is most preferred that both leaching and stripping stages of the process of the invention are carried out in closed reaction vessels, and that any of the leaching chemical's volatile elements that volatilize during leaching are recovered for recycling. This enables the process to be carried out at reduced pH's, of for example 8 to 10, since it is not necessary to maintain the pulp pH at a higher level during leaching to prevent loss of the volatile component(s) of the leaching chemical(s). This then enables a reduction in the use of pH modifying chemical reagents. However, the process of the invention with air stripping of the leaching chemical(s) residual volatile elements may alternatively be carried out at pH's in excess of 10. Removal of residual leaching chemical's volatile element(s), or leaching process volatile products, by air stripping may also be carried out at such a higher pH, although the efficiency will be lowered, or alternatively the pH of the pulp after leaching and prior to stripping may be reduced to ensure optimum stripping of undesirable components. It has also been found that carrying out leaching and stripping at such lower pH levels leads to less fouling of the carbon or other adsorption media in carbon-in-pulp type processes where the metal(s) is recovered by adsorption, so that less frequent cleansing and reactivation of the carbon is required. It has also been found that carrying out leaching and stripping at such low pH levels leads to greater recovery of cyanide.

In accordance with the invention removal or stripping of residual elements of the leaching chemical(s) from the pulp or clear liquor is carried out prior to recovery of at least the major portion of the valuable metal(s) from the pulp or liquor. It is intended to include within the scope of the invention the possibility of adsorption to recover a minor part of the valuable metal(s) before the air stripping stage. In the case of carbon-in-leach processes for example, stripping would not be carried out until leaching is complete or substantially complete, but carbon adsorption may begin towards the end of leaching and prior to stripping. For example, leaching may be carried out in a series of leach tanks followed by stripping followed by passage of the stripped, pregnant pulp to a series of adsorption tanks. Some adsorption before the completion of leach may be effected by addition of carbon to the last few of the leach tanks, to adsorb a minor portion of the valuable metal complexes, with removal of the carbon prior to passage of the pulp to stripping, and removal of the remaining major portion of the metal(s) in the subsequent adsorption tanks.

Figure 2:
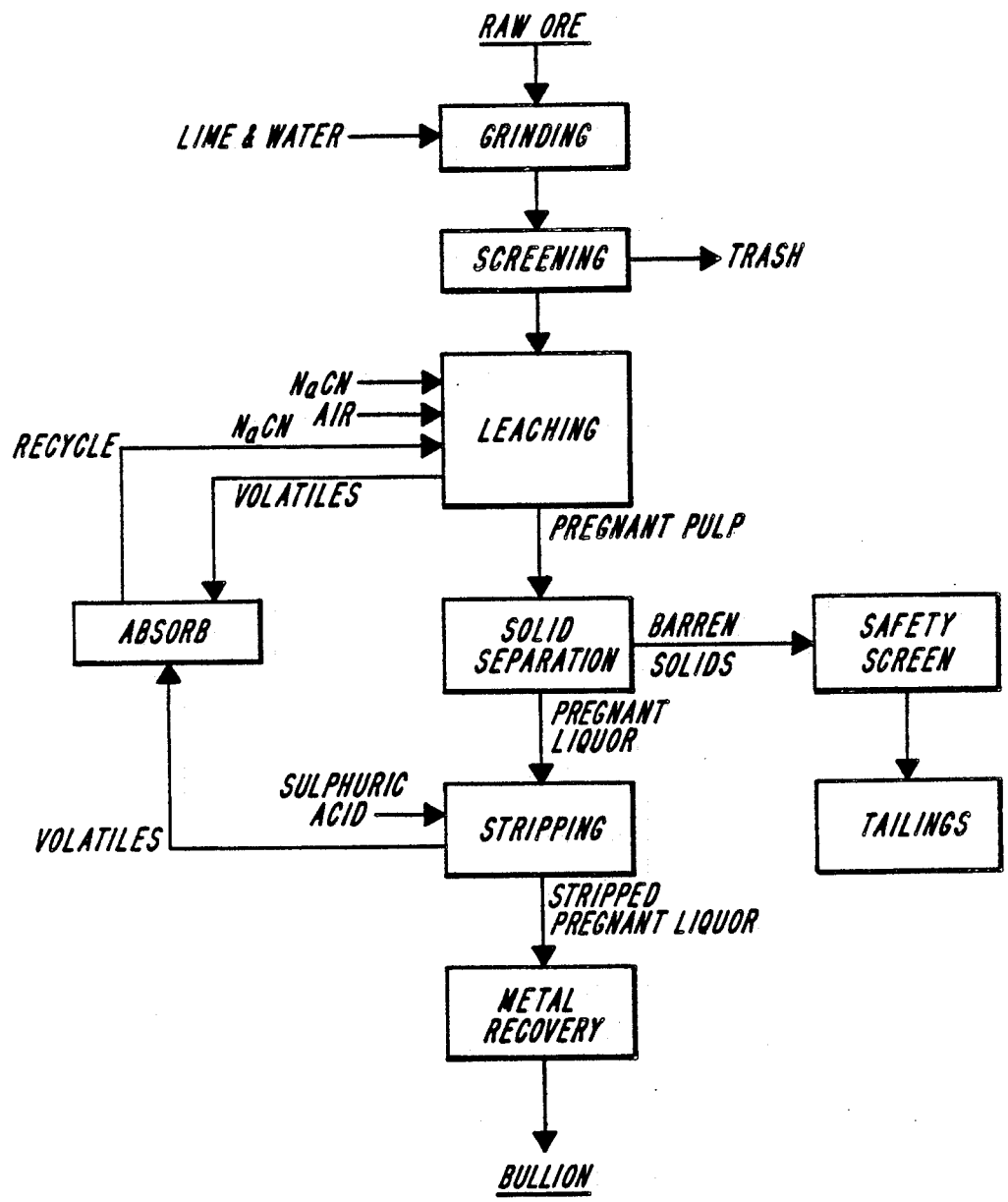

The process of the invention will be further described with reference to its application in the recovery of gold from ores thereof employing an alkali metal cyanide particularly NaCN as the leaching chemical, by way of example, but it will be apparent that the process of the invention is equally applicable to leaching processes for the recovery of silver using NaCN or the like, cobalt, nickel, or copper using ammonia and so forth as referred to previously. In the accompanying drawings:

FIG. 1 is a flow chart showing the steps in obtaining the gold from the raw ore by a carbon-in-pulp type process of the invention, with recovery of the gold complexes from the pregnant pulp by adsorption onto activated carbon, showing also the steps in recycling for reuse of the cyanide, and FIG. 2 is a flow chart showing the steps in obtaining the gold from the raw ore by a process wherein a pregnant liquor component of the pulp containing the gold complexes is separated from the solids, with recovery of the gold complexes from the pregnant liquor by zinc cementation or the like.

In both processes shown in FIGS. 1 and 2, raw ore from which the gold is to be recovered is first finely ground with water in a mill. The grinding media may be made of an alloy of iron or non-ferrous material or an artificial ceramic material. The ore is ground to an average particle size typically 80% finer than 50 microns in the presence of lime to raise the pH of the slurry to the level to be achieved, as is known in the art.

The slurry of ground ore known as the pulp is then passed into leaching vessels such as a series of covered tanks having internal agitation, to which is added the NaCN leaching chemical. Leaching may be conducted at higher pH's such as 10 or above as in conventional processes but alternatively leaching may be carried out at a lower pH in the range 8 to 10 so that less lime to raise the pulp to the desired pH need be added. Air is passed through the pulp in the leaching vessels. An arrangement of fans or blowers and ducts carries away any volatile HCN from the pulp during leaching. The cyanide thus recovered during leaching is reconverted to NaCN for re-use in the leaching process by the HCN adsorber as will be described. As the cyanide leaching chemical is recycled, excess leaching chemical may thus be used, even at the lower pH's that may be employed with the process of the invention, to maximize the leaching of the gold from the ore.

The pregnant pulp containing the leached ore contains among other things the complex cyanides of gold and residual cyanide leaching chemical which has not reacted in the leaching process, as free cyanide, which is removed by the process of the invention before recovery of the gold. In the carbon-in-pulp type process of FIG. 1 the free cyanide is then removed from the pregnant pulp in its gaseous form as HCN by contacting the pulp with a flow of air to remove the residual cyanide into air i.e. air stripping. This may be achieved by passing air through the pulp as the continuous phase, or by passing the pulp through the air as the continuous phase, either cocurrently or countercurrently. Particular air stripping arrangements that may be mentioned include tanks and columns with bubble diffusers, and packed tower, grid tower, and spray tower arrangements. Alternative to air another stripping gas may be employed. Air removal of volatiles in most processes will be quite adequate but it is possible that other gases may be more effective in some situations.

Sufficient stripping of volatiles may be achieved at higher pH's of 10 or above but preferably the pH of the pregnant pulp is first reduced prior to stripping, if necessary, to around pH 8 or even to as low as pH 2 if there are many complex cyanides such as those of copper, zinc, and iron to be decomposed. Reduction of the pH may be achieved by the addition of a suitable acid, such as sulphuric acid.

As is most preferred, the cyanide which has been air stripped from the pregnant pulp is recycled back into the leaching stage. For example the HCN gas with stripping air and that from the leach tanks may be reconverted to NaCN in the liquid phase by passing the air stripped gas into a highly alkali solution of NaOH at a pH of at least 12.

After removal of the residual cyanide the pregnant pulp is then contacted with carbon or a resin adsorption media for removal of the gold cyanide complexes. In the process shown, granular activated carbon is then added to the adsorption tanks to adsorb the gold cyanide complexes. Alternatively carbon column techniques where the carbon is contained in columns through which the pulp flows may be employed, for example. After adsorption the pulp containing the carbon particles passes to screening wherein the coarser carbon adsorption media is separated from the balance of the pulp. For example the carbon may be of an average particle size 2000 microns and be separated by a screening system of aperture size 600 microns. The gold is then recovered from the carbon by elution as is known in the art and the carbon subjected to regeneration for reuse.

The barren pulp resulting may be passed through a safety screen and then to tailings ponds. The tailings contain a reduced level of environmentally undesirable cyanide.

In the process of FIG. 2 wherein the liquor component of the pulp containing the valuable metals is separated from the solids before stripping, the pregnant pulp passes after leaching to a solid-liquid separation stage. Separation of the pregnant liquor from the solid pulp may be achieved by thickening, filtration and washing. The balance of the pulp separated from the pregnant liquor, referred to as barren solids, may be disposed of as tailings whilst the pregnant liquor is then subjected to stripping by a flow of air to remove the residual cyanide into air. Any suitable air stripping technique as referred to previously may be employed. Again, whilst sufficient stripping of volatiles may be achieved at higher pH's, preferably the pH of the pregnant liquor is reduced to around pH 8 or even to as low as pH 2, which may be achieved by the addition of a suitable acid such as sulphuric acid to the liquor before stripping.

As is again most preferred, the cyanide which has been air stripped from the pregnant liquor is recycled back into the leaching stage. The HCN gas in the air from the leach tanks and the stripping air may be reconverted to NaCN in the liquid phase by passing the air into a highly alkali solution of NaOH at a pH of greater than 12.

After removal of the residual cyanide the metals are then recovered from the pregnant liquor. Zinc cementation wherein zinc, typically as a dust, may be employed to precipitate the gold out of the pregnant liquor, but precipitation and solvent extraction processes may be used too.

In the FIG. 1 flow chart shown, in the carbon-in-pulp process the pulp is subjected to leaching and the pregnant pulp is then subjected to air stripping followed by adsorption. In accordance with the invention the major portion of adsorption of the gold from the pulp is carried out after stripping but it is possible for carbon to be added to the last few of the leaching tanks to adsorb a minor portion of the gold and the carbon then removed before the pregnant pulp is subjected to air stripping, followed by passage of the pregnant pulp to the adsorption tanks for adsorption of the remaining major portion of the gold.

The following examples further illustrate the invention:

EXAMPLES

Ore samples for the test runs were supplied by Waihi Gold Mining Co Ltd from Coromandel Peninsula, New Zealand. The two bulk samples of ore were crushed separately in a hammer mill and roll crusher and reduced to a grain size of less than 1 mm. The crushed material was blended by coning and quartering and then divided into representative samples by riffling. The one sample was used for Examples 1, 2 and 3, and the other samples for Example 4.

EXAMPLE 1

A 2 kg charge of crushed ore was placed in a 15 l ceramic ball mill and 2 kg of a water and sufficient lime added to raise the pH to 8.9. The sample was then ground to 85% passing 73 microns. A further 2 kg of water was then added to transfer the ground pulp to a 20 l open necked glass jar. The pulp density in the jar was 33% solids.

2120 mg of cyanide as 4000 mg of sodium cyanide was added and the jar rolled slowly for 30 hours.

The pregnant pulp was then stripped of its residual cyanide in a column 1 meter high by 150 mm in diameter. Sulphuric acid was added to reduce the pH to approximately 8.0 and compressed air passed through the column using fans from the bottom via a diffuser at a constant flow rate of 100 l/minute for 10 minutes per kilogram of pulp. To recover the cyanide, the cyanide laden air was then ducted to a second column containing 5 l of 0.04 N caustic soda solution.

The stripped pregnant pulp was then placed back in the open necked glass jar and 6 g/kg of conditioned activated carbon with an average extended length of 3500 microns, added. The jar was then rolled for 8 hours. The carbon was then screened from the pulp, via screens with an aperture size of 500 microns, washed with a minimum amount of water and air dried.

The cyanide recovered in the air-stripping process was 1680 mg. Cyanide remaining in the barren pulp for disposal as tailings was therefore 440 mg.

The gold and silver recovered from the ore was 7.12 mg, from a theoretically available 7.76 mg, and 11.6 mg from a theoretically available 23.6 mg respectively.

EXAMPLE 2

The process of Example 1 was repeated with the lime added to the crushed ore being sufficient to raise the pH to 9.5. Sulphuric acid was again used to lower the pH to approximately 8.0 for air-stripping.

In this case the cyanide recovered by air stripping was 1730 mg. Cyanide remaining in the barren pulp for disposal as tailings was therefore 390 mg.

The gold and silver recovered was 7.16 mg, from a theoretically available 7.50 mg, and 9.14 mg, from a theoretically available 23.5 mg, respectively.

EXAMPLE 3

The process of Example 1 was repeated with the water and lime mixture added to the crushed ore being sufficient to raise the pH to 10.4. Sulphuric acid was again used to lower the pH to approximately 8.0 for air-stripping.

The cyanide recovered was 1730 mg. The cyanide remaining in the barren pulp for disposal as tailings was therefore 390 mg.

The gold and silver recovered was 6.76 mg, from a theoretically available 7.08 mg, and 14.5 mg, from a theoretically available 25.2 mg, respectively.

EXAMPLE 4

The process of Example 1 was again used with a 0.6 kg charge of a different crushed sample and 0.6 kg of water and sufficient lime added to raise the pH to 9.5, ground in a 5 l ceramic ball mill. Following grinding, the pulp was transferred with 0.6 kg of water to a 2.5 l open necked, glass jar.

640 mg of cyanide as 1200 mg of sodium cyanide was then added.

Sulphuric acid was again used to lower the pH to approximately 8.0 for air-stripping.

The cyanide recovered was 530 mg. The cyanide remaining in the barren pulp for disposal as tailings was therefore 110 mg.

The gold and silver recovered was 0.95 mg from a theoretically available 1.02 mg, and 2.33 mg, from a theoretically available 4.0 mg, respectively.

The foregoing describes the invention including preferred forms and specific examples thereof. The application of the process with various alterations and modifications will be obvious to those skilled in the art and is intended to be incorporated within the scope hereof as defined in the following claims.

I claim:

1. A process for recovering a valuable metal or metals from an ore or ores thereof, comprising forming a pulp of particles of the ore(s), said pulp having at least a solid element, a liquor component, and at least one leaching chemical, said leaching chemical being selected to react with the valuable metal(s) to remove same, contacting at least the liquor component of the pulp containing the valuable metals with a flow of gas for removal into the gas of any volatile residual elements of the leaching chemical and volatile products of the leaching process, said removal being effected prior to recovery of any major portion of the valuable metal(s) from the pulp, isolating for recirculation said gas containing the removed material, and recovering the valuable metal(s).

2. A process as claimed in claim 1, wherein prior to recovery of the valuable metal(s) at least the liquor component of the pulp is contacted with a flow of gas by passing the gas through same to remove said volatile residual elements or volatile leaching products.

3. A process as claimed in claim 2, wherein at least a portion of the leaching chemical(s) volatile elements removed are reconverted for reuse in the leaching process.

4. A process as claimed in claim 3, wherein air from the external environment is passed through the pulp to remove said volatile residual elements from the pulp, and the removed residual volatiles of the leaching chemicals are reconverted for reuse in the leaching process, and the air substantially free of components removed from the pulp is recycled or returned to the external environment.

5. A process as claimed in claim 4, also including removing any volatile elements of the leaching chemical(s) and/or volatile products of the leaching process volatilizing from the pulp during leaching.

6. A process as claimed in claim 5, wherein any said volatile residual elements or volatile leaching products volatilizing from the pulp during leaching are removed by passing a flow of gas through the leaching pulp to remove said volatiles into the gas.

7. A process as claimed in claim 6, wherein said volatile residual elements of the leaching chemical(s) removed from the pulp during leaching are reconverted for reuse in the leaching process.

8. A process as claimed in claim 3, wherein the flow of a gas is passed through substantially the whole pulp prior to recovery of any major portion of the valuable metals therefrom.

9. A process as claimed in claim 3, wherein the flow of gas is passed through substantially the whole pulp prior to recovery of any major portion of the valuable metals therefrom and removal of the valuable metal(s) from the balance of the pulp is carried out by adsorption of the valuable metal complexes onto an activated carbon, resin, or other adsorption media.

10. A process as claimed in claim 3, wherein a liquor component containing the valuable metal(s) is separated from the balance of the pulp and only said liquor component is subjected to said flow of gas for removal of said leaching chemicals volatile residual element(s) or volatile products of the leaching process.

11. A process as claimed in claim 3, wherein a liquor component containing the valuable metal(s) is separated from the balance of the pulp and only said liquor component is subjected to said flow of gas for removal of said leaching chemicals, volatile residual elements or volatile products of the leaching process, and wherein recovery of the valuable metal(s) from said liquor component containing the valuable metal(s) is achieved by precipitation, solvent extraction, zinc cementation, or electrowinning.

12. A process as claimed in claim 3, wherein removal after leaching of said leaching chemical(s) residual volatile elements or volatile leaching products is carried out at a pH in the range 2 to 10.

13. A process as claimed in claim 3, wherein leaching and removal after leaching of leaching chemical(s) residual volatile elements or volatile leaching products is carried out at a pH in the range 8 to 10.

14. A process as claimed in claim 3, wherein the pH at which removal of said leaching chemical(s) residual volatile elements or volatile leaching process products is carried out is reduced below the pH at which leaching is carried out, by addition to the pulp after leaching of pH reducing agents.

15. A process as claimed in claim 3, wherein the valuable metals are gold or silver and the leaching chemical comprises an alkali metal cyanide.

16. A process as claimed in claim 15, wherein the cyanide content of the pulp after removal of residual volatiles and the valuable metal(s) is less than 20 ppm.

17. A process as claimed in claim 13, wherein leaching and said removal of volatiles is carried out in process vessels closed to the ambient environment.

* * * * *